United States Patent
Gunasekara

(10) Patent No.: US 8,438,228 B1
(45) Date of Patent: May 7, 2013

(54) COMPUTING DEVICE TO BROADCAST MOBILE MESSAGES RECEIVED BY A MOBILE DEVICE

(75) Inventor: Don Gunasekara, Reston, VA (US)

(73) Assignee: Sprint Communications Company L.P., Overland Park, KS (US)

( * ) Notice: Subject to any disclaimer, the term of this patent is extended or adjusted under 35 U.S.C. 154(b) by 1049 days.

(21) Appl. No.: 12/040,434

(22) Filed: Feb. 29, 2008

(51) Int. Cl.
*G06F 15/16* (2006.01)
*G06F 17/00* (2006.01)

(52) U.S. Cl.
USPC .......................................... 709/206; 715/239

(58) Field of Classification Search ................... 709/206; 715/234–242
See application file for complete search history.

(56) References Cited

U.S. PATENT DOCUMENTS

| | | | |
|---|---|---|---|
| 2004/0189699 A1* | 9/2004 | Dobronsky | 345/751 |
| 2004/0248617 A1* | 12/2004 | Oba et al. | 455/557 |
| 2006/0256144 A1* | 11/2006 | Chung | 345/905 |
| 2007/0214222 A1* | 9/2007 | Chang et al. | 709/206 |
| 2008/0005691 A1* | 1/2008 | Malik et al. | 715/765 |
| 2008/0201664 A1* | 8/2008 | O | 715/835 |
| 2009/0106366 A1* | 4/2009 | Virtanen et al. | 709/206 |

* cited by examiner

Primary Examiner — Jeong S Park

(57) ABSTRACT

Some of the embodiments described herein generally relate to broadcasting mobile messages received by a mobile device onto a surface that is easier to read. Mobile messages generally refer to SMS, MMS, e-mail, and voice-mail messages. The mobile device communicates the mobile messages to a computing device that is affixed with a projector and lens, which together broadcast the mobile message onto the surface. In some embodiments, the mobile message may alternatively be broadcast out of a lens affixed to the mobile device for display on the surface. Additionally, a user may compose mobile messages on the computing device and send the composed messages to the mobile device for communication across a telecommunications network.

18 Claims, 9 Drawing Sheets

COMPUTING DEVICE TO BROADCAST MOBILE MESSAGES RECEIVED BY A MOBILE DEVICE

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

One aspect of the invention is directed to broadcasting a mobile message received by a mobile device out of a projector affixed to a computing device. A list of message options are displayed to a user. The computing device and mobile device are configured to communicated with one another via a low-powered radio frequency (RF) or infrared (IR) connection. Once the user selects an option to view mobile messages received by the mobile device, requests for: (1) the mobile message, and (2) a template for the type of mobile message being requested are sent to the mobile device. The mobile device returns the template and mobile messages. For each mobile message, a representation of the template is populated with the mobile message's data, and the populated template is presented to the user (either an on-board display or through a projection component).

Another aspect of the invention is directed to sending a mobile message composed on a computing device to a mobile device for transmission through a telecommunications network. The composed mobile message is stored in a text buffer until the user chooses to either send to the mobile device, save, or delete. If sent, the composed message is communicated to the mobile device.

Still another aspect of the invention is directed to a computing device capable of broadcasting mobile messages received by a mobile device onto a surface. The computing device is equipped with a transceiver capable of receiving and deciphering low-powered RF signals or IR signals. Once a mobile message is transmitted to the computing device, the mobile message is broadcast out of a projector on the computing device. Additionally, the computing device is equipped to receive mobile message composed by a user and transmit the composed message to the mobile device for transmission across a telecommunications network.

BRIEF DESCRIPTION OF THE SEVERAL VIEWS OF THE DRAWINGS

The present invention is described in detail below with reference to the attached drawing figures, wherein.

DETAILED DESCRIPTION

Figure 1:
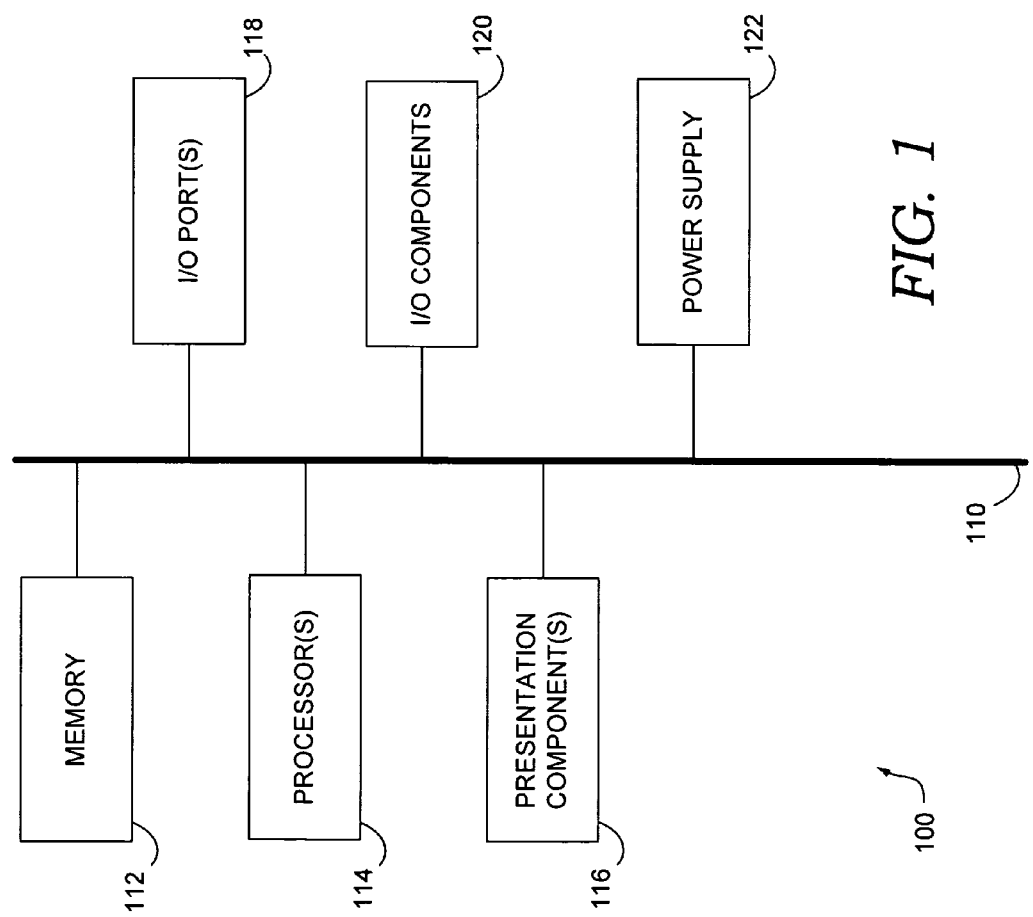
FIG. 1 is a block diagram of an exemplary operating environment for use in implementing an embodiment of the present invention.

The subject matter described herein is presented with specificity to meet statutory requirements. The description herein, however, is not intended to limit the scope of this patent. Rather, it is contemplated that the claimed subject matter might also be embodied in other ways, to include different steps or combinations of steps similar to the ones described in this document, in conjunction with other present or future technologies. Moreover, although the term "block" may be used herein to connote different elements of methods employed, the term should not be interpreted as implying any particular order among or between various steps herein disclosed.

Further, various technical terms are used throughout this description. A definition of such terms can be found in *Newton's Telecom Dictionary* by H. Newton, $21^{st}$ Edition (2005). These definitions are intended to provide a clearer understanding of the ideas disclosed herein but are not intended to limit the scope of the present invention. The definitions and terms should be interpreted broadly and liberally to the extent allowed the meaning of the words offered in the above-cited reference.

The invention can generally be described as one or more systems for, methods to, and computer-storage media storing instructions to effectively communicate mobile messages between a mobile device and a computing device, such that either device can broadcast the mobile messages on a screen or other flat surface. Such a system allows users to view larger displays of their mobile messages, thus freeing the users from struggling to view the screens of conventional mobile devices and computing devices.

A mobile message, as used herein, refers to a communicative message (including text, images, audio, or video) sent by one user to another user using mobile or computing devices. Examples of mobile messages include, without limitation, electronic-mail (e-mail) messages, short message service (SMS) messages, multimedia messaging service (MMS) messages, or similar message sent or the like. Mobile messages are not limited to messages containing text; rather, mobile messages also include voice-mail messages and video messages, as well.

As one skilled in the art will appreciate, embodiments of the present invention may be embodied as, among other things: a method, system, or computer-program product that is embodied on one or more tangible computer-readable media. Accordingly, the embodiments may take the form of a hardware embodiment, a software embodiment, or an embodiment combining software and hardware.

In one embodiment, the present invention takes the form of a computer-program product that includes computer-useable instructions embodied on one or more computer-readable media. Computer-readable media include both volatile and nonvolatile media as well as removable and nonremovable media.

By way of example, and not limitation, computer-readable media comprise computer-storage media. Computer-storage media, or machine-readable media, include media implemented in any method or technology for storing information. Examples of stored information include computer-useable instructions, data structures, program modules, and other data representations. Computer-storage media include, but are not limited to, random access memory (RAM), read-only memory (ROM), electrically erasable programmable read-only memory (EEPROM), flash memory used independently from or in conjunction with different storage media, such as, for example, compact-disc read-only memory (CD-ROM), digital versatile discs (DVD), holographic media or other optical disc storage, magnetic cassettes, magnetic tape, magnetic disk storage, or other magnetic storage devices. These memory components can store data momentarily, temporarily, or permanently.

Having briefly described a general overview of the embodiments described herein, an exemplary computing device is described below. Referring initially to FIG. 1 in particular, an exemplary operating environment for implementing the present invention is shown and designated generally as computing device 100. Computing device 100 is but one example of a suitable computing environment and is not intended to suggest any limitation as to the scope of use or functionality of the invention. Neither should computing device 100 be interpreted as having any dependency or requirement relating to any one or combination of components illustrated. In one embodiment, computing device 100 is a conventional computer (e.g., a personal computer or laptop).

One embodiment of the invention may be described in the general context of computer code or machine-useable instructions, including computer-executable instructions such as program modules, being executed by a computer or other machine. Generally, program modules including routines, programs, objects, components, data structures, and the like refer to code that perform particular tasks or implement particular abstract data types. Embodiments described herein may be practiced in a variety of system configurations, including hand-held devices, consumer electronics, general-purpose computers, more specialty computing devices, etc. Embodiments described herein may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation components 116, input/output ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be gray and fuzzy. For example, one may consider a presentation component such as a display device to be an I/O component. Also, processors have memory. It will be understood by those skilled in the art that such is the nature of the art, and, as previously mentioned, the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. By way of example, and not limitation, computer-readable media may comprise RAM; ROM; EEPROM; flash memory or other memory technologies; CDROM, DVD or other optical or holographic media; magnetic cassettes, magnetic tape, magnetic disk storage or other magnetic storage devices, or similar tangible media that configurable to store data and/or instructions relevant to the embodiments described herein.

Memory 112 includes computer-storage media in the form of volatile and/or nonvolatile memory. The memory may be removable, nonremovable, or a combination thereof. Exemplary hardware devices include solid-state memory, hard drives, cache, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

A mobile device, as described herein, refers to any type of mobile phone, handheld device, personal digital assistant (PDA), BlackBerry®, smartphone, handheld device, or other mobile device (aside from a laptop) capable of communicating mobile messages. In one embodiment, the mobile device is outfitted with a lens and configured to project representations of mobile messages on a screen, wall, or other viewable surface. This allows a user to view the normal display of the mobile message on the display of the mobile device or view a larger representation of the mobile message projected on a screen.

Figure 2:
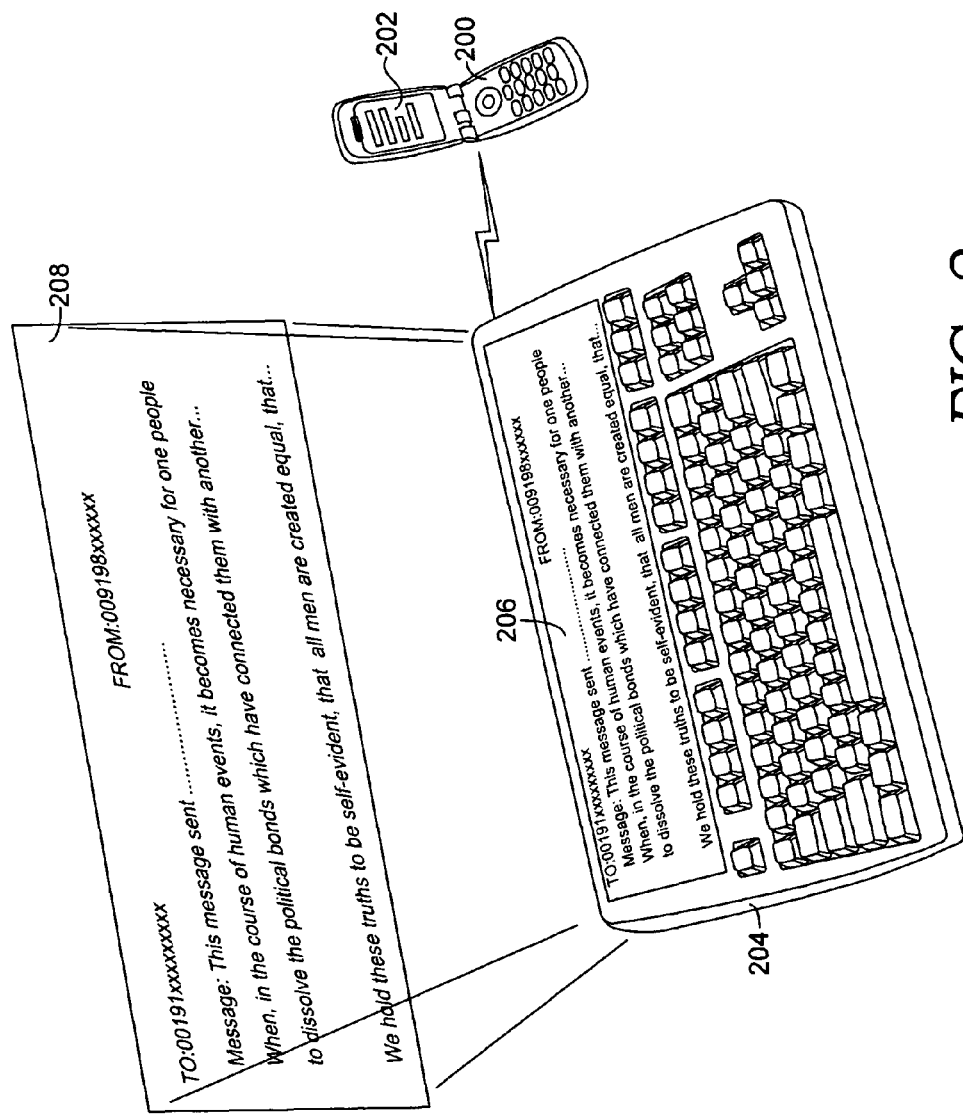
FIG. 2 is a diagram illustrating a mobile device communicating with a computing device in accordance with an embodiment of the invention.

FIG. 2 illustrates a mobile device 200 communicating with a computing device 204 in accordance with an embodiment of the invention. The mobile device 200 includes a mobile-device screen 202, which one skilled in the art will appreciate can display mobile messages received by the mobile device 200. In one embodiment, the mobile device 200 communicates mobile messages to the computing device 204 for display on a computing-device screen 206 or as a projection 208 through a lens (not shown) affixed to the computing device 204 onto a surface. Projection 208 may be displayed on a wall screen or on any relatively flat surface.

In one embodiment, the mobile message is formatted in a manner specified by the sender of the mobile message. For instance, the sender may choose to change the font, size, or font type (e.g., bold, underlined, strike through, italicize) of portions of text in the mobile message. Also, the mobile message may be written as a collection of paragraphs that are indicated through indentions or through spacing. For images, a portion of the image may be highlighted for emphasis. Videos may contain additional markers or pointers added to emphasis portions of a scene. One skilled in the art will appreciate that mobile messages may be formatted in any number of well-known ways.

The specific formatting designated by the user, in one embodiment, is communicated along with the mobile message from the mobile device 200 to the computing device 204. The computing device 204 is configured to display the formatted version of the message on either the computing device screen 206 or through a lens. This ensures that the message is displayed with the formatting the sender intended—e.g., text is displayed in paragraph form (not merely in wrap-around form), images contain the sender's highlighting, or video contains the sender's additions.

The user may access mobile messages received by the mobile device 200 using the computing device 204. Additionally, the user may compose mobile messages on the computing device 204 and have the composed messages transmitted to the mobile device 200 for communication across a telecommunications network. A telecommunications network may include an RF network, mobile-phone network, cable network, or the like. Also, a telecommunications network may include various wireless networks, for example, Wi-Fi, or Worldwide Interoperability for Microwave Access (WiMAX)

Figure 3:
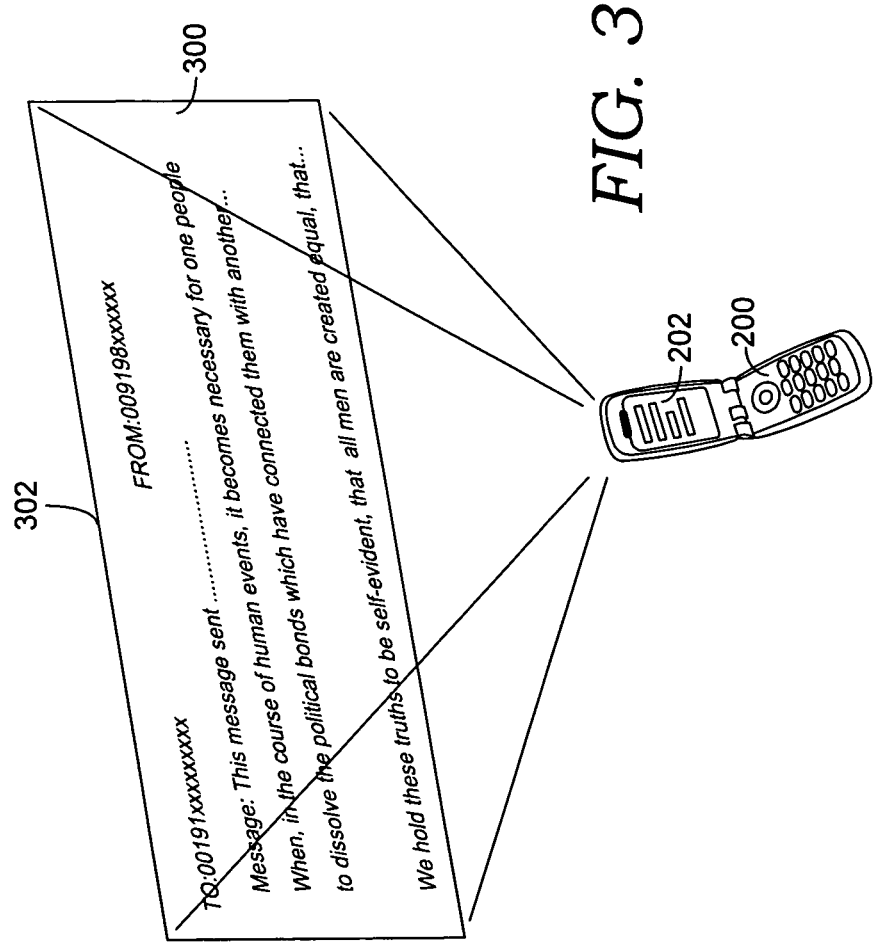
FIG. 3 is a diagram of mobile device broadcasting a mobile message in accordance with an embodiment of the invention.

FIG. 3 is a diagram of the mobile device 200 broadcasting a mobile message 300 in accordance with an embodiment of the invention. In one embodiment, the mobile device 200 is equipped with a lens and is configured to broadcast a projection 302 of the mobile message 300 onto a screen, wall, or relatively flat surface. Projection 302 may, in one embodiment, display a representation of mobile message 300, as intended by the sender of mobile message 300—i.e., according to the sender's formatting.

Figure 4:
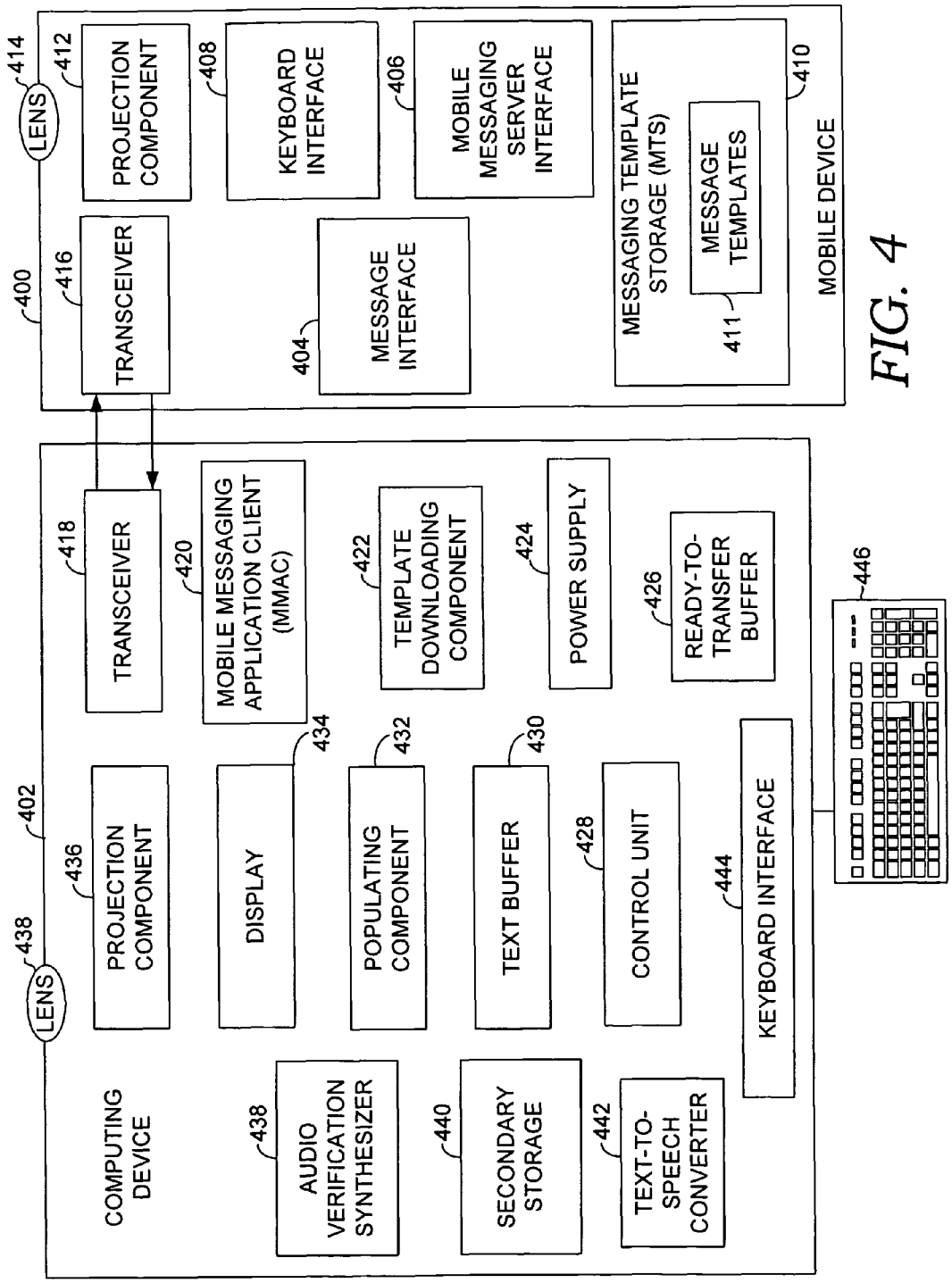
FIG. 4 is a block diagram illustrating a mobile device communicating with a computing device in accordance with an embodiment of the invention.

FIG. 4 is a block diagram illustrating a mobile device 400 communicating with a computing device 402 in accordance with an embodiment of the invention. In one embodiment, the mobile device 400 and the computing device 402 communicate mobile messages back and forth for display on either's displays or for projection through either's lenses 414 and 438. The mobile device 400 and the computing device 402 communicate with one another, allowing the user to interact with one device while using the other device. For example, the user may compose a mobile message on the computing device 402 and send it to the mobile device 400 for communication across a telecommunications network. Or the user could use the mobile device 400 to automatically push mobile messages to the computing device 402 (e.g., via Bluetooth) and command the computing device 402 to project the mobile messages. In one embodiment, a user can view mobile messages received by the mobile device 400 on the display 434 of the computing device 402. Alternatively, mobile messages received by the mobile device 402 may be viewed on a surface upon projection of the mobile messages by the computing device 402 through the lens 438.

Once displayed, either on display 434 or through lens 438, the user can interact with the computing device 402 through manipulation of I/O devices (e.g., keyboard 446) to request different messages received by the mobile device 400. The user may use the keyboard 446 to scroll through various e-mails, SMS messages, MMS messages, voice-mail messages, or other messages received by the mobile device 400.

Additionally, the user can compose mobile messages on the computing device 402 and communicate the composed messages to the mobile device 400 for transmission across a telecommunications network. For example, a user may use the computing device 402 to create an e-mail message, which can be communicated to the mobile device 400. The mobile device 400 can then send the created e-mail to its intended recipient through a telecommunications network.

Both the mobile device 400 and the computing device 402 comprise a number of software and hardware components. Specifically, the mobile device 400 includes a message interface 404, mobile messaging server interface 406, keyboard interface 408, messaging template store (MTS) 410, projection component 412, lens 414, and transceiver 416. One skilled in the art will understand that alternative embodiments may include other software or hardware, as FIG. 4 merely depicts an exemplary embodiment of the invention.

The message interface 404 is software configured to interface with text messages stored on the mobile device 400 via an I/O device on the mobile device 400. One skilled in the art will understand that the mobile device 400 may comprise several I/O devices, for example, a keyboard, scroll wheel, scroll ball, microphone, Bluetooth handset, universal serial bus (USB) cable, or other input device.

The mobile messaging server interface 406 includes software and a transceiver configured to communicate with a server hosting the user's mobile messages to retrieve the user's mobile messages. Mobile messages may be pushed to the messaging server interface 406 from the server, or requested by the messaging server interface 406. The messaging server interface 406 may be configured to transfer and receive mobile messages using any well-known communications protocol, such as transmission control protocol/Internet protocol (TCP/IP), user datagram protocol (UDP), or the like. Certain mobile messages (e.g., SMS, MMS, or e-mail) may be sent using the TCP/IP protocol, while others (e.g., voice-mail messages) may be sent using UDP.

In one embodiment, the keyboard interface 408 is software that generates and provides soft keys for accessing the display of the computing device 402. The soft keys may be presented on the display of the mobile device 400 or projected through the lens 414 of the mobile device 400. The soft keys may derive their meaning from what is presently being displayed, either on the display of the mobile device 400 or through the lens 414. Examples of soft keys created by the keyboard interface may include: "View SMS Message," "View MMS Message," "View E-mail," "Listen to Voice Mail," "Compose SMS Message," "Compose MMS Message," "Compose E-mail." One skilled in the art will appreciate that other soft keys are also possible.

The MTS 410 is a computer-storage medium that stores a collection of message templates 411 relating to types (e.g., SMS, MMS, e-mail, voice mail of mobile messages. In operation, when a mobile message is received by the mobile device 400, the mobile message is parsed so that portions of the mobile message can be arranged in a file according to one of the message templates 411. For example, an SMS message may be parsed to identify the sender, receiver, subject, heading, time, date, and body of the message. The mobile message 300 may identify various portions of the mobile message, in one embodiment, by searching for keywords, tags, or schema in the mobile message itself. Once specific portions of the mobile message are identified, the mobile device 400, in one embodiment, arranges the identified portions in one of the templates 411 corresponding to the mobile message (e.g., templates for SMS messages, MMS messages, voice-mail messages).

The projection component 412 includes a projector configured to broadcast mobile messages from the mobile device 400 to a screen, wall, or other surface. In one embodiment, the projection component includes a motor (e.g., a stepper motor, server motor, or the like) that controls the lens 414. In operation, soft keys allowing a user to adjust an image being projected by the projection component 412 are created by the keyboard interface 408 and presented to the user. Soft keys may be presented on the display of the mobile device 400 that allow a user to zoom, focus, or pan the mobile message being projected by the projection component 412. For example, a particular arrow key (i.e., a hard key) on the phone may be assigned a soft key that, when selected, zooms the mobile message being projected by instructing the motor in the projection component 412 to manipulate the placement of the projector in projection component 412. One skilled in the art will appreciate that various motors may be controlled in different manners to manipulate a projected mobile message.

The mobile device 400 communicates with the computing device 402 via transceivers 416 and 418. In one embodiment, the transceivers 416 and 418 communicate via a wireless connection. Examples of wireless connections that may be used by transceivers 416 and 418 include, for example but without limitation, low-powered RF signals (such as via Bluetooth), IR signals (such as via infrared data association (IrDA) protocols), or the like. For Bluetooth communication, the transceivers 416 and 418 may transmit data via low-power radio waves with specific frequencies (e.g., between 2.40 GHz and 2.480 GHz). Operationally, the transceivers 416 and 418, when operating as Bluetooth transceivers, communicate information using a Bluetooth protocol. Bluetooth protocols may include, for example but without limitation, Bluetooth version 1.0, 1.1, or 2.0. As one skilled in the art will understand, a Bluetooth-enabled device creates wireless personal area networks (PANs), or "piconets." Once another Bluetooth-enabled device enters the PAN, the two can communicate. For example, the mobile device 400 may be able to communicate with the computing device 402 when the mobile device 400 enters the PAN of the computing device 402.

A number of IrDA protocols may be used for IR exchange of data between the transceivers 416 and 418. These protocols communicate data between transceivers 416 and 418 using IR signals. IrDA protocols may include, for example, serial infrared link (SIR), infrared link access protocol (IrLAP), and infrared link management protocol (IrLMP). In operation, IrLAP may be used for link initialization, device address discovery, connection start-up, information exchange, disconnection, link shutdown, and to explain device address conflict resolution on an IR connection. Additionally, IrLAP may implement a high-level data-link control (HDLC) communications protocol to manage data transfer.

Along with the transceiver 418, the computing device 402 includes a mobile messaging application client (MMAC) 420, template downloading component (TDC) 422, power supply 424, ready-to-transfer buffer 426, control unit 428, text buffer 430, populating unit 432, display 434, projection component 436, lens 438, audio verification synthesizer 438, secondary storage 440, text-to-speech converter 442, and keyboard interface 444. Also, an I/O device may be connected to the computing device 402, such as a keyboard 446 or, in other embodiments, a microphone, set of headphones, or other I/O device (not shown for clarity). Keyboard interface 444 receives signals from keyboard 446 and converts them into signals that may be processed by the control unit 428. It should be noted that FIG. 4 is provided merely for explanatory purposes, and other embodiments of the invention may include different hardware and software components than those illustrated.

The computing device 402, in one embodiment, is configured to remain in an "off" position until the mobile device 400 is brought within a communicative distance of the computing device 402. For instance, the computing device 402 may remain off until the computing device 402 and the mobile device 400 are within each other's PAN, or "piconet." Alternatively, the computing device 402 remains off until the computing device 402 detects IR signals. Moreover, the power supply 424 provides power to the control unit 428, as well as to other hardware devices on the computing device 402.

The MMAC 420 is a software application executed by the control unit 428, which comprises a microprocessor, microcontroller, or other processor executing an operating system (OS) and controlling the software and hardware operations performed by the computing device 402. Specifically, the MMAC 420 is configured to process mobile messages received by the transceiver 418 and compose mobile messages on the computing device 402, as created by the user. Also, the MMAC 420 is further configured to generate a list of messaging options for a user. Examples of messaging options include, without limitation, creating an SMS, MMS, e-mail, or voice-mail message, as well as accessing received SMS, MMS, e-mail, or voice-mail messages. In one embodiment, the MMAC 420 stores formatting data for the different templates that identify how to format mobile messages. The formatting data may be used to designate where to place the different portions of a particular mobile message, e.g., the "To," "From," Re," "Date/Time," or body of the mobile message.

The TDC 422 is software configured to store downloaded mobile-messaging templates generated by and received from the mobile device 400 (specifically, templates stored in the MTS 410). In operation, the MMAC 420 accesses the TDC 422 whenever a user attempts to compose a mobile message on the computing device 402. A mobile-message template stored by the TDC 422 is selected by the MMAC 420 based on the desired mobile message selected by the user. For instance, whenever a user chooses to compose an e-mail message, the MMAC 420 retrieves a template stored by the TDC 422 for e-mail messages.

Additionally, the MMAC 420 is configured to request mobile messages sent to the mobile device 400. To do so, the MMAC 420 creates a request for the mobile messages desired by the user (e.g., SMS, MMS, voice mails) and communicates the request to the transceiver 418, which in turn communicates the request to the mobile device 400. The mobile device may then either instruct the messaging server interface 406 to request the mobile messages a hosting server if the mobile messages have not been downloaded to the mobile device 400. Once received, the downloaded messages are then sent to the computing device 402 and communicated to the MMAC 420. Or, if the mobile messages have already been downloaded to the mobile device 400, the downloaded messages are sent to the computing device 402 and communicated to the MMAC 420.

Once a template and a mobile message are received by the computing device 402, the MMAC 420 populates a representation of the template (which is stored in the TDC 422) with the data of the received mobile message. For example, the "To," "From," "Subject," "Date/Time," and "Body" of the representation of the template are populated with corresponding portions of the received mobile message. In one embodiment, the MMAC 420 is configured to parse data in the received messages based on either tags, keywords, or schema to determine how to populate different portions of the template representation.

Once a representation of a template has been populated, the MMAC 420 stores the representation in the text buffer 430 (discussed below) and eventually presents the populated template to the populating component 432 for display. The populating component 432 is software that drives the display of display 434 or projection component 436. Display 434 may be any well-known display device, such as a liquid crystal display, light-emitting diode (LED) display, organic LED (OLED) display, or the like. In particular, the populating unit comprises one or more drivers necessary to display a composed or received mobile message on display 434 or projection component 436.

Similar to the projection component 412 on the mobile device 400, a projection component 436 on the computing device 402 includes a projector that broadcasts displays specified by the populating component 436. The projection component 436, in one embodiment, includes a motor (e.g., stepper or server) that can be used to manipulate the position of the projector in the projection component 436, in order to zoom, pan, or otherwise manipulate the broadcast of a mobile message. The broadcasts are projected through lens 438 and onto a screen, wall, or surface for display. In one embodiment, the user can control the presentation of the mobile message by manipulating the motor in the projection component 436, allowing the user to zoom, pan, or otherwise change the mobile message.

The ready-to-transfer buffer 426 and the text buffer 430 are regions of memory on the computing device 402 that are used to temporarily hold data before the data is transmitted. The ready-to-transfer buffer 426 is configured to store composed mobile messages or signaling messages before transmission to the mobile device 400. The text buffer 430 temporarily stores either received or composed mobile messages before the mobile messages are sent to the populating unit 432 for display or sent to the text-speech-converter 442 for processing.

Mobile messages received by the computing device 402 may be converted from text to voice, in some embodiments, allowing a user to have messages read to them through the computing device. To do so, a representation of a received mobile message is stored in the text buffer and then processed by the text-to-speech converter 442, which is configured to create an audio version of the text of the mobile message. In one embodiment, the text-to-speech converter 442 is configured to execute a number of tasks. Initially, the text-speech-converter 442 converts raw text containing symbols (e.g., numbers and abbreviations) into the equivalent of written-out words. This process can be thought of as the pre-processing stage. Next, phonetic transcriptions may be assigned to each word, and the resultant text may be divided into prosodic units, such as phrases, clauses, and sentences. The text-to-speech converter 442 then converts the transcriptions and prosody information into sound using previously stored audio sounds. One skilled in the art will appreciate that various other methods may alternatively be used to convert text into its audio representation.

In the embodiment illustrated in FIG. 4, the text-to-speech converter 442 executes on-board the computing device 402. In alternative embodiments, text of the mobile message is transmitted to a server, or other computing device, hosting a text-to-speech-converter, and the resultant audio is returned to the computing device 402. Thus, text-to-speech conversions may be made off-board the computing device 402.

Secure access to the computing device 402 may or may not be an issue in some circumstances. A number of functionalities may be added to the computing device 402 to ensure that only allowed users can access the computing device 402. For example, the computing device 402 may be configured to unlock upon entry of a valid username and password. Alternatively, authentication of the user may be predicated on recognition of the user's voice. In one embodiment, the audio verification synthesizer 438 receives audio from a user (e.g., by the user speaking into a connected microphone) and compares the audio with previously stored audio files of the user to determine whether the user actually spoke into the microphone. If the audio verification synthesizer 438 verifies the user spoke into the microphone, the computing device 402 may be unlocked. One skilled in the art will understand that numerous types of voice-comparison software may be used to authenticate words spoken by the user.

Secondary storage 440 represents memory that can be used by any of the above features to store information. Additionally, secondary storage 440 may be used to store drafts of mobile messages that a user wants to save for later editing.

In one embodiment, the user is presented with a number of options for retrieving and composing mobile messages. In one embodiment, these options may be presented on the computing device 402. In another embodiment, the options are presented on the mobile device 400. Examples of the options include, without limitation, "Send SMS," "Send MMS," "Send E-mail," "View SMS," "View MMS," and "View E-mail." Of course, the options themselves may be named differently; however, the message options will invariably provide the user with the ability to compose mobile messages, send mobile messages, or view mobile messages received by the mobile device 400.

Figure 5:
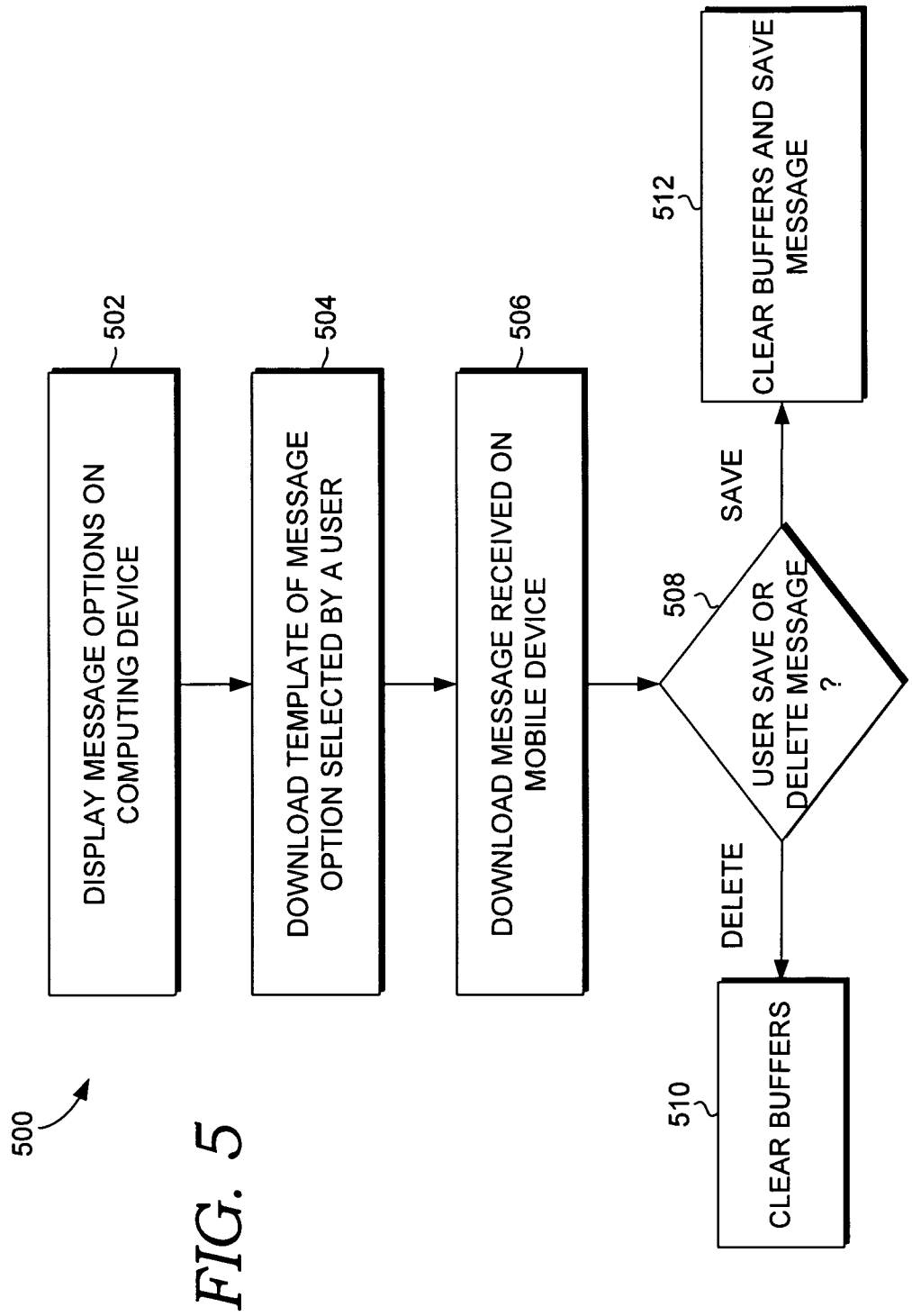
FIG. 5 is a diagram of a flow chart illustrating a process of viewing a mobile message received by a mobile device on a computing device in accordance with an embodiment of the invention.

FIG. 5 is a diagram of a flow chart illustrating a process 500 for viewing a mobile message received by a mobile device on a computing device in accordance with an embodiment of the invention. Initially, message options are presented to a user on or through (i.e., via lens 438) the computing device 402, as indicated at block 502. The message options are presented within a user interface so the user can select a desired option. For example, a user may select an option to view SMS messages received on the mobile device 400. Once an option is selected, the computing device 402 downloads a message template corresponding to the type of mobile message indicated in the selection by the user—in the previous example, an SMS message—as indicated at block 504. In one embodiment, the message template is retrieved from the mobile device 400, e.g., the MTS 410. The specific mobile messages indicated by the user in the message option are downloaded from the mobile device 400, as indicated at block 506. Options are then presented to the user to either delete or save the downloaded messages, as indicated at decision block 508. If deleted, memory buffers on the computing device 402 are cleared, as indicated at block 510. And if saved, a template-representation of the downloaded mobile message is saved on the computing device 402 and memory buffer cleared, as indicated at block 512.

Figure 6:
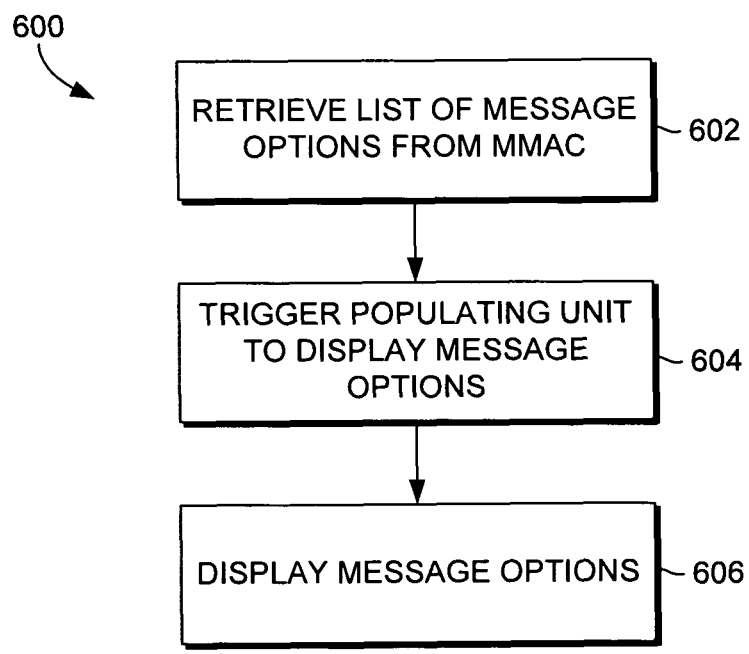
FIG. 6 is a diagram of a flow chart illustrating a process for displaying message options to a user in accordance with an embodiment of the invention.

FIG. 6 is a diagram of a flow chart illustrating a process 600 for displaying message options to a user in accordance with an embodiment of the invention. Once the computing device 402 is powered on (e.g., when the mobile device 400 is within Bluetooth range or when an IR signal is received), message options are presented on the computing device 402. Initially, the control unit 428 invokes the MMAC 420 to retrieve a list of message options, as indicated at block 602. Once retrieved, the control unit 428 also triggers the populating unit 432 to display the retrieved message options on the display 438 or through the lens 438, as indicated at block 604. The retrieved message options are then presented to the user on or through (i.e., via the lens 438) the computing device 402, as indicated at block 606.

To display anything on the display 434 or through the projection component 436, the data to be displayed, in one embodiment, is first sent to the populating unit 432. The populating unit, in one embodiment, includes drivers for presenting the data on the display 434 or through the projection component 436. In one embodiment, when the user selects a message option, a template specific to the mobile message of the selected option is downloaded to the computing device 402. Templates may differ depending on the type of mobile message associated with the selected option, thus sometimes necessitating different templates for different message types. For example, the template for an SMS message may differ from the template of an MMS message.

Figure 7:
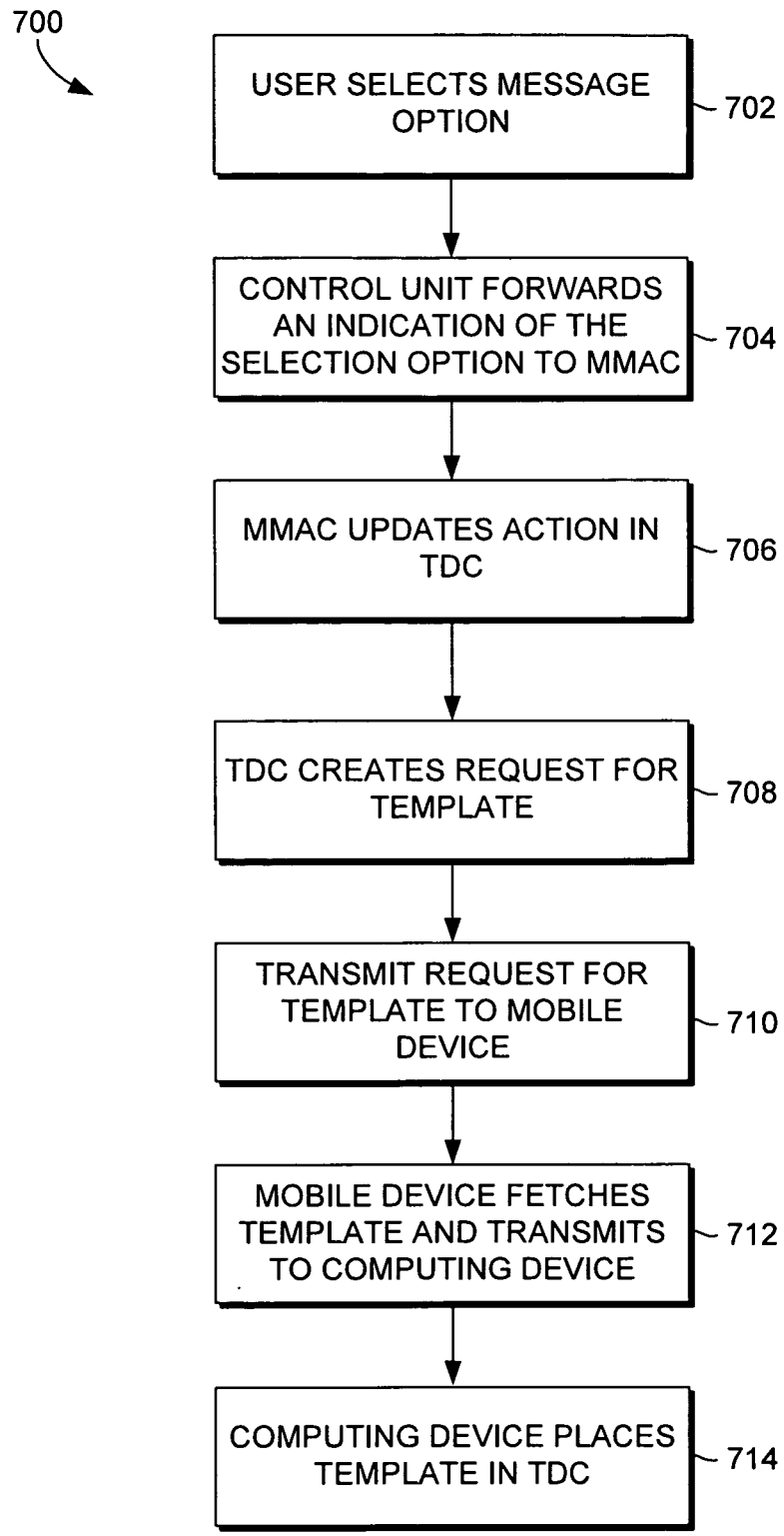
FIG. 7 is a diagram of a flow chart illustrating a process for downloading a template corresponding to a message option selected by the user in accordance with an embodiment of the invention.

FIG. 7 is a diagram of a flow chart illustrating a process 700 for downloading a template corresponding to a message option selected by the user in accordance with an embodiment of the invention. Initially, a user selects a message option from a list of message options, as indicated at block 702. The control unit 428, in one embodiment, forwards an indication of the user's selected option to the MMAC 420 (indicated at block 704), which in turn updates the action to be performed in the TDC 422. Alternatively, an indication of the selected mobile option may simply be transmitted to the transceiver 418 for communication to the mobile device 402, thus skipping block 706. If the TDC 422 is utilized, the TDC 422 creates a request for the template specified by the selected option, as indicated at block 706. For example, if a user desires to "View e-mail," the TDC 422 creates a request for a template corresponding to e-mail messages, as indicated at block 708.

The created request is sent to the mobile device 402, as indicated at block 710. Mobile device 402 fetches the appropriate template from the templates stored in the MTS 410, and transmits the retrieved template back to the computing device, as indicated at block 712. Once received, the returned template is stored in the TDC 422 on the computing device 402, as indicated at block 714.

Figure 8:
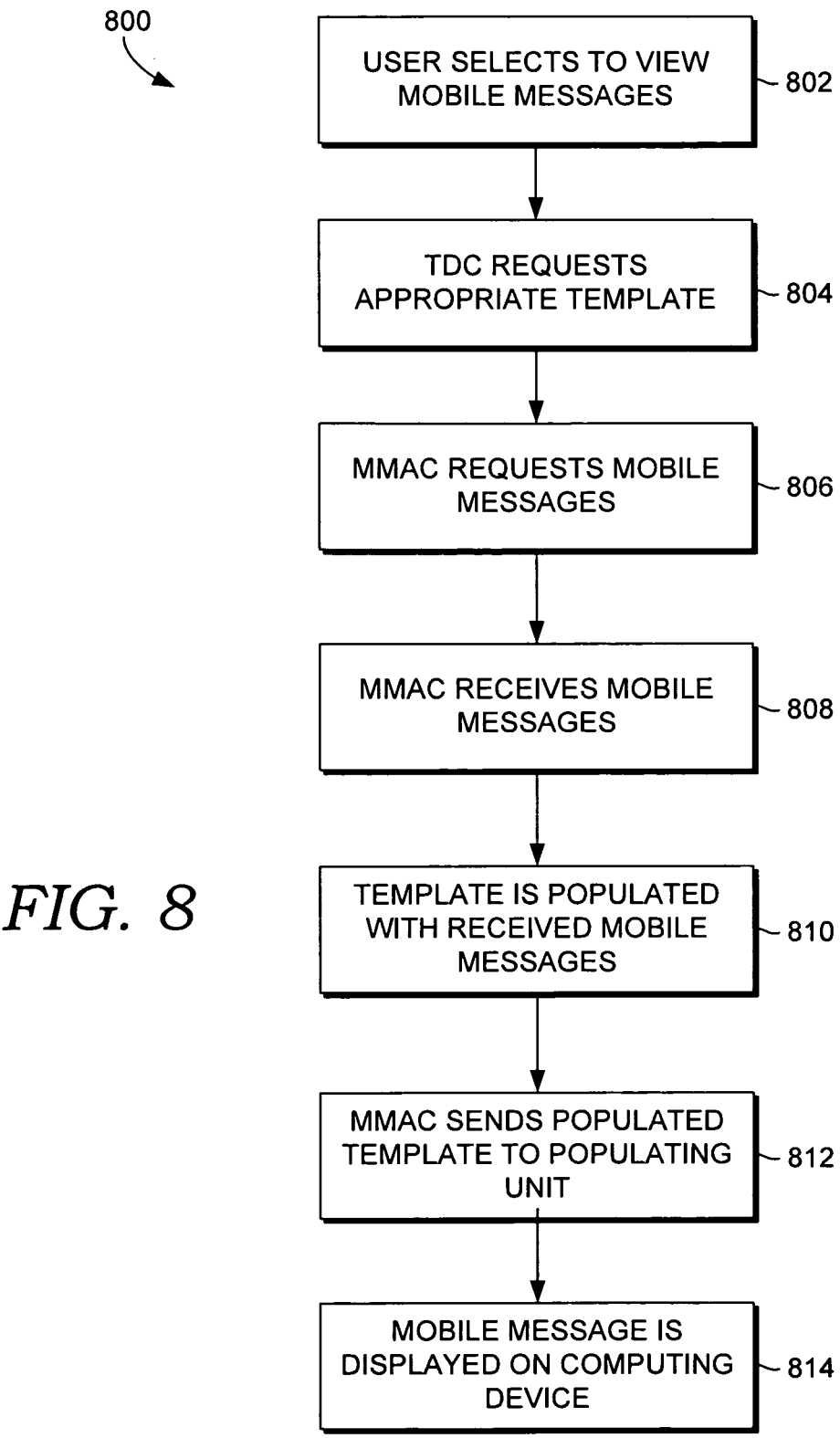
FIG. 8 is a diagram of a flow chart illustrating a process for downloading mobile messages from a mobile device to a computing device in accordance with an embodiment of the invention.

FIG. 8 is a diagram of a flow chart illustrating a process 800 for downloading mobile message from a mobile device to a computing device in accordance with an embodiment of the invention. Once the user elects to view mobile messages received by the mobile device 400 (indicated at block 802), the TDC 422 is configured, in one embodiment, to request the appropriate template associated with the user's requested mobile message. For example, if the user chooses to view SMS messages, the TDC 422 instructs the transceiver 418 to submit a request to the mobile device 400 for an SMS template. Eventually, the mobile device 400 selects the relevant template from the MTS 410 and transmits the relevant template back to the computing device 402, as indicated at block 804.

As indicated at block 806, the computing device 402 will also prepare a request for the mobile messages associated with the user's choice (e.g., MMS, SMS, e-mail, voice mail). The transceiver 418 will submit this request to the mobile device 400. To retrieve the mobile messages, the mobile messaging server interface 406, in one embodiment, contacts a server hosting the appropriate mobile messages to retrieve the mobile messages, as indicated at block 808. For example, the mobile messaging server interface 406 may request all the e-mail messages in the user's inbox or all the mobile messages that have been deleted by the user—both of which are stored on the server. Such a request may be sent over an RF network using standard messaging protocols (e.g., TCP/IP, UDP, SOAP, or the like).

Once the mobile device 400 receives the messages from the server, the mobile messaging device 400 transmits the received messages to the computing device 402. The MMAC 420 then parses each of the received mobile messages and populates a template representation accordingly, as indicated at block 810. In one embodiment, the MMAC 420 also takes into account formatting specified by a sender of a mobile message when populating a representation of a template. For example, if a sender italicized a word, or indented separate paragraphs in a message, the MMAC 420 maintains such formatting in the populated template. Furthermore, templates that have been populated with received mobile messages are then sent to the populating unit 432 (as indicated at block 812) for display either on the display 434 or through the lens 438, as indicated at block 814.

Figure 9:
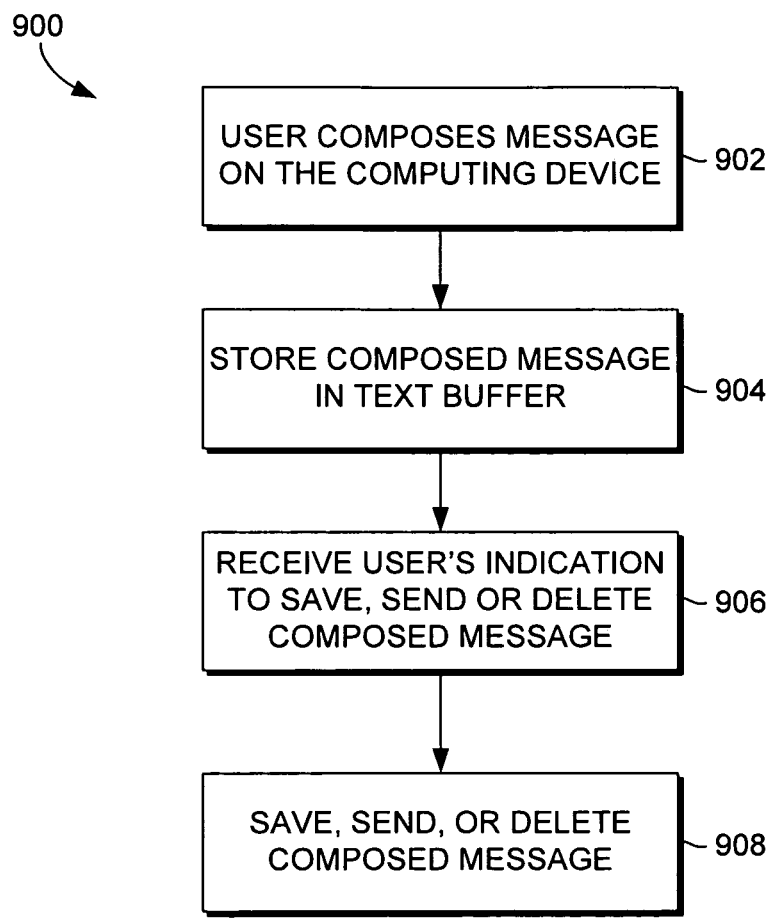
FIG. 9 is a diagram of a flow chart illustrating a process for composing mobile messages on the computing device in accordance with an embodiment of the present invention.

If the user desires to compose a mobile message on the computing device 402, a process such as process 900 illustrated in FIG. 9 may be initiated. FIG. 9 is a diagram of a flow chart illustrating process 900 for composing the mobile message on the computing device in accordance with an embodiment of the present invention. As indicated at block 902 of FIG. 9, a user initially composes a mobile message. Once composed, the mobile message is stored in the text buffer 430, as indicated at block 904.

The user may then choose whether to save, send, or delete message (indicated at block 906) by selecting the desired option in a menu. The user's desired action (i.e., send, save, or delete) is received by the control unit 428 and sent to the MMAC 420. In one embodiment, indicated at block 908, the MMAC 420 is configured to either transmit the composed message to the mobile device 400, save the composed message in secondary storage 442, or instruct the control unit 428 to erase the portion of the text buffer 430 storing the composed message. If the user wants to send the composed message to the mobile device 400, the MMAC 420 sends the mobile message to the ready-to-transfer buffer 426. The transceiver 418 then transmits the mobile message to the mobile device 400, and the mobile device 400 sends the mobile message to the mobile message server interface 406 for delivery across a telecommunications network.

Although the subject matter has been described in language specific to structural features and methodological acts, it is to be understood that the subject matter defined in the appended claims is not necessarily limited to the specific features or acts described above. Rather, the specific features and acts described above are disclosed as example forms of implementing the claims. For example, sampling rates and sampling periods other than those described herein may also be captured by the breadth of the claims.

The invention claimed is:

1. One or more non-transitory computer-readable media having computer-executable instructions embodied thereon for performing a method of presenting on a computing device a representation of a mobile message received by a mobile device, the method comprising:
    displaying a list of message options on the computing device, wherein the list of message options is based on a particular type of mobile message, wherein the particular type of mobile message is selected from a group including a short message service (SMS) message, a multimedia message service (MMS) message, an email, and a voice mail, and wherein the list of messages options changes according to the particular type of mobile message displayed;
    receiving an indication from a user to retrieve one or more mobile messages sent to the mobile device, wherein the indication designates the particular type of mobile message;
    requesting a template associated with the particular type of mobile message from the mobile device, wherein the template is unique for each of the particular type of mobile message;
    requesting the one or more mobile messages received by the mobile device;
    receiving the one or more mobile messages from the mobile device;

populating a representation of the template with data associated with at least one of the one or more mobile messages; and presenting the representation of the template.

2. The media of claim 1, wherein the message options comprise viewing short message service (SMS) messages, viewing e-mail messages, composing an SMS message, and composing an e-mail message.

3. The media of claim 1, wherein the message options further comprise at least one or viewing a multimedia messaging service (MMS) message or composing an MMS message.

4. The media of claim 1, wherein the computing device and the mobile device communicate across a low-powered RF connection.

5. The media of claim 4, wherein the low-powered radio frequency (RF) connection is a Bluetooth connection.

6. The media of claim 1, wherein the template is received via an infrared signal.

7. The media of claim 1, wherein the computing device and the mobile device communicate using infrared data association (IrDA) protocols.

8. The media of claim 1, wherein the particular type of mobile message comprises at least one of a SMS, MMS, e-mail, or voice-mail message.

9. The media of claim 1, wherein populating a representation of the template with data associated with at least one of the one or more mobile messages further comprises populating the representation with formatting originally specified by a sender of the at least of the one or more mobile messages.

10. The media of claim 1, wherein presenting the representation of the template on the computing device comprises displaying the representation on a display on-board the computing device.

11. The media of claim 1, wherein presenting the representation of the template comprises projecting the representation out a lens affixed to the computing device.

12. One or more non-transitory computer-readable media having computer-executable instructions embodied thereon for performing a method of composing a mobile message on a computing device and transmitting the mobile message to a mobile device for communication across a telecommunications network, comprising:

receiving input from a user of a composed mobile message, wherein the composed mobile message indicates a recipient, and wherein the composed mobile message is selected from a group including a short message service (SMS) message, a multimedia message service (MMS) message, an email, and a voice mail;

presenting the composed message on the computing device;

storing the composed mobile message in a text buffer;

receiving an indication to send the composed mobile message;

transmitting the composed mobile message to the mobile device using at least one of a transceiver for low-powered radio frequency (RF) signal or a transceiver for infrared (IR) signals;

receiving a template associated with a type of mobile message associated with the composed mobile message, wherein the template is unique for each of the particular type of mobile message; and populating the template with data related to the composed mobile message.

13. The media of claim 12, wherein presenting the composed message on the computing device comprises broadcasting the composed message through a lens affixed to the computing device.

14. The media of claim 12, wherein presenting the composed message on the computing device comprising displaying the composed message on a display on-board the computing device.

15. A computing device, having a processor coupled to a memory, configured to display a mobile message sent to a mobile device, comprising:

a populating unit configured to present a representation of the mobile message, wherein the mobile message is selected from a group including a short message service (SMS) message, a multimedia message service (MMS) message, an email, and a voice mail;

a template downloading component configured to receive a template corresponding to a mobile-message type associated with the mobile message, wherein the template is unique for each of the particular type of mobile message;

a transceiver configured to receive the template and the mobile message from the mobile device;

a mobile messaging application client (MMAC) configured to:

(1) receive data associated with the mobile message, (2) populate a representation of the template with the data, and (3) transmit the representation of the template to the populating unit for presentation; and a projection component configured to broadcast the representation of the template out of a lens affixed to the computing device.

16. The computing device of claim 15, wherein the transceiver receives the template and the mobile message by way of at least one of low-powered radio frequency (RF) signals or infrared signals.

17. The computing device of claim 16, further comprising broadcasting the representation of the template out of a lens affixed to the mobile device.

18. The computing device of claim 17, wherein one or more formatting designations comprise one or more separated paragraphs.

* * * * *